United States Patent
Hiraga et al.

(10) Patent No.: US 6,409,957 B1
(45) Date of Patent: Jun. 25, 2002

(54) PROCESS OF AND APPARATUS FOR INJECTION MOLDING

(75) Inventors: Noritsugu Hiraga; Okito Nishio, both of Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/435,858

(22) Filed: Nov. 8, 1999

(30) Foreign Application Priority Data

Nov. 13, 1998 (JP) .......................................... 10-323871

(51) Int. Cl.$^7$ ......................... B29C 45/00; B29C 45/50
(52) U.S. Cl. ..................................... 264/328.1; 425/589
(58) Field of Search ....................... 264/328.1; 425/589

(56) References Cited

U.S. PATENT DOCUMENTS 4,615,669 A  10/1986  Fujita et al.

FOREIGN PATENT DOCUMENTS

| EP | 0 188 622 A1 | 7/1986 |
| EP | 0 247 208 A1 | 12/1987 |
| EP | 0 427 866 A1 | 5/1991 |
| EP | 0 627 289 A1 | 12/1994 |

*Primary Examiner*—Leo B. Tentoni
(74) *Attorney, Agent, or Firm*—Arent Fox Kintner Plotkin & Kahn

(57) ABSTRACT

A stationary plate is fixed to a rear end of a cylinder section. A movable plate is disposed such that it can be advanced and retracted relative to the stationary plate. An injection member is disposed within the cylinder section such that it can be advanced and retracted. The rear end of the injection member is rotatably supported by the movable plate. A drive unit generates rotation when driven. Conversion units disposed between the stationary plate and the movable plate and are adapted to covert a rotational force to a thrust force. A transmission unit is disposed between the drive unit and one of the conversion units and is adapted to transmit a rotation generated by the drive unit to the conversion unit. A synchronization unit is provided in order to synchronize the rotation of the one of the conversion units with rotations of the remaining conversion units. In this case, rotation generated by the drive unit is transmitted via the transmission unit to one of the conversion units, and the rotation of the one conversion unit is synchronized with rotation of the remaining conversion units.

19 Claims, 5 Drawing Sheets

PROCESS OF AND APPARATUS FOR INJECTION MOLDING

BACKGROUND OF THE INVENTION

1. Field of the Invention

The present invention relates to an injection apparatus.

2. Description of the Related Art

Conventionally, in an injection molding machine, resin heated and melted in a heating cylinder is injected into a cavity of a mold apparatus under high pressure so that the cavity is filled with the resin. The molten resin is then cooled and solidified within the cavity so as to obtain a molded article.

The injection molding machine includes a mold clamping apparatus and an injection apparatus. The mold clamping apparatus is provided with a stationary platen and a movable platen. The movable platen is advanced and retracted by a mold clamping cylinder, to thereby perform mold closing, mold clamping, and mold opening.

The injection apparatus includes a heating cylinder for heating and melting resin supplied from a hopper, and an injection nozzle for injecting the molten resin. Further, a screw is disposed within the heating cylinder such that the screw can be rotated and can be advanced and retracted. When the screw is advanced by a drive section disposed at the rear end of the screw, the resin is injected from the injection nozzle, and when the screw is retracted by the drive section, the resin is metered.

The drive section comprises a front plate for supporting the heating cylinder; a rear plate disposed a predetermined distance away from the front plate; guide bars disposed between and supported by the front plate and the rear plate; and a movable plate disposed to be slidable along the guide bars. The above-described screw is rotatably supported by the movable plate. A ball screw shaft and a ball nut are disposed between the front plate and the movable plate. When an injection motor is driven to rotate the ball screw shaft or the ball nut, the movable plate is advanced or retracted.

Figure 1:
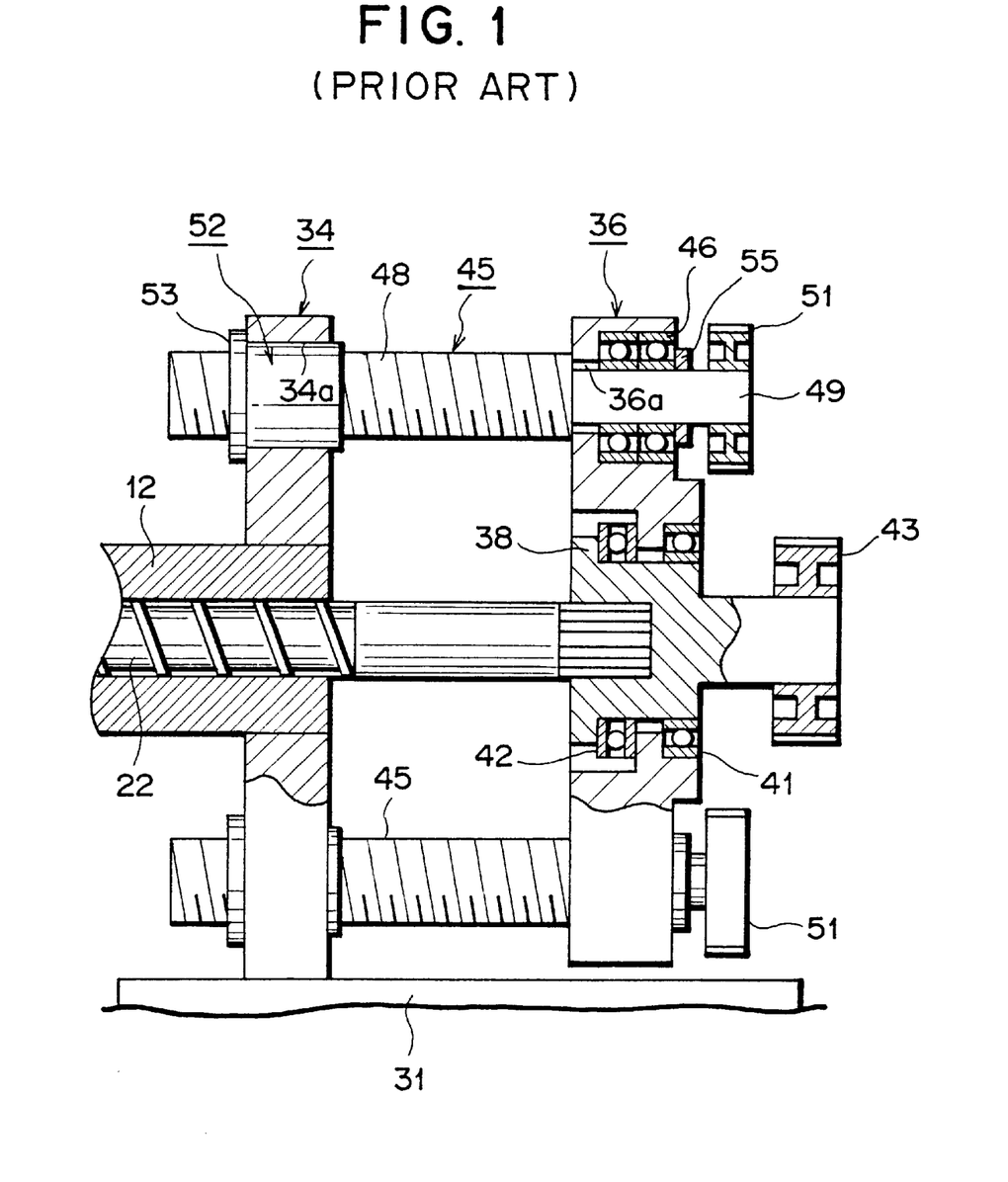
FIG. 1 is a sectional view of a drive section of a conventional injection apparatus.
Figure 2:
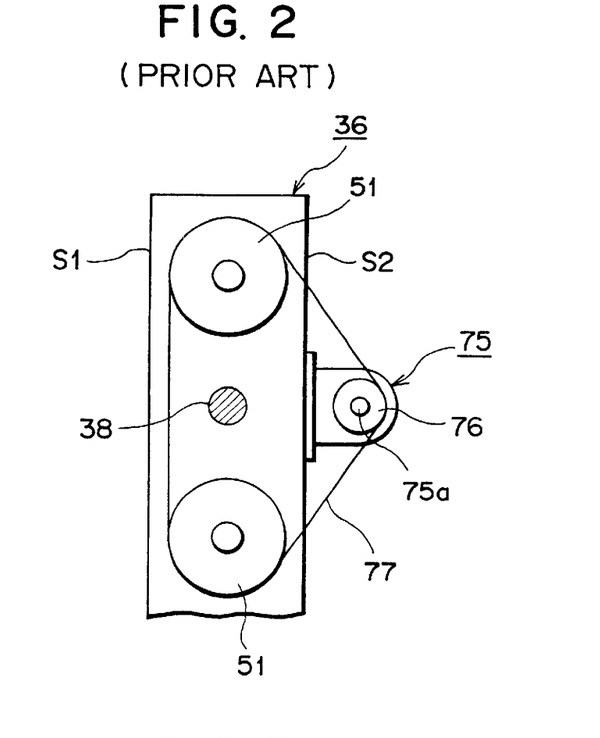
FIG. 2 is a side view of the drive section of the conventional injection apparatus.
Figure 3:
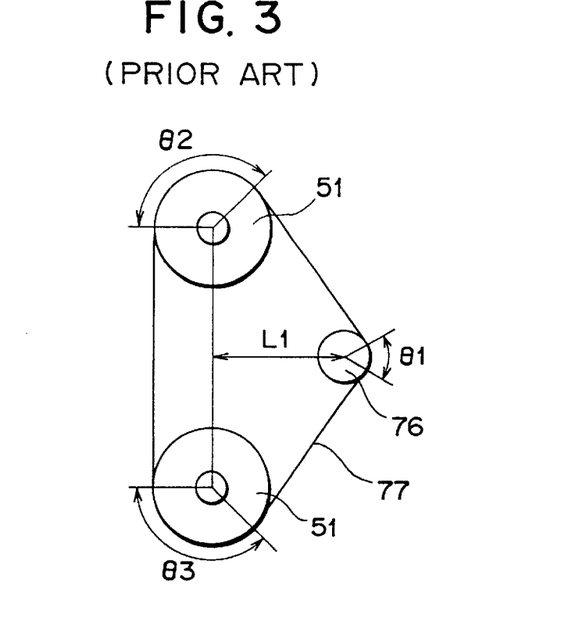
FIG. 3 is a schematic diagram showing the concept of the drive section of the conventional injection apparatus.

FIG. 1 is a sectional view of a drive section of a conventional injection apparatus; FIG. 2 is a side view of the drive section of the conventional injection apparatus; and FIG. 3 is a schematic diagram showing the concept of the drive section of the conventional injection apparatus.

In these drawings, reference numeral 12 denotes a heating cylinder, 22 denotes a screw, 31 denotes a slide table slidably disposed on an unillustrated frame, and 34 denotes a stationary plate fixed to the slide table 31. The rear end (right end in FIG. 1) of the heating cylinder 12 is fixed to the stationary plate 34. Further, a movable plate 36 is disposed such that the movable plate 36 can be advanced and retracted relative to the stationary plate 34.

A screw support shaft 38 is disposed at the approximate center of the movable plate 36 and is rotatably supported thereby via bearings 41 and 42. The rear end of the screw 22 is fixed to the screw support shaft 38, and a driven pulley 43 is fixed to the rear end of the screw support shaft 38.

An unillustrated metering motor is attached to one side surface S1 of the movable plate 36, and an unillustrated drive pulley is attached to the output shaft of the metering motor. An unillustrated timing belt extends between and is wound, under tension, around the drive pulley and the driven pulley 43. The bearing 42 assumes the form of a thrust bearing in order to bear injection force that acts on the screw 22 upon injection.

Two parallel ball screw shafts 45 are disposed at positions in the vicinity of the circumferential edge of the movable plate 36 and are rotatably supported by the movable plate 36 via bearings 46. Each of the ball screw shafts 45 has a screw portion 48 and a shaft portion 49 projecting from the rear end (right end in FIG. 1) of the screw portion 48. The shaft portion 49 penetrates a hole 36a formed in the movable plate 36 and extends rearward (rightward in FIG. 1), and a driven pulley 51 is attached to the rear end of the shaft portion 49. The screw portion 48 penetrates a hole 34a formed in the stationary plate 34 and extends frontward (leftward in FIG. 1) to be screw-engaged with a ball nut 52 attached to the stationary plate 34. The ball nut 52 has a flange portion 53 at its front end (left end in FIG. 1) and is fixed to the stationary plate 34 by use of unillustrated bolts that penetrate the flange portion 53. Reference numeral 55 denotes a press plate for pressing the bearing 46.

An injection motor 75 is attached to the approximate center of the other side surface S2 of the movable plate 36. A drive pulley 76 is attached to the output shaft 75a of the injection motor 75, and a timing belt 77 extends between and is wound, under tension, around the drive pulley 76 and the driven pulley 51.

Next, operation of the injection apparatus having the above-described structure will be described.

In a metering stage, when the screw 22 is rotated through driving of the metering motor, resin falls from an unillustrated hopper and enters the heating cylinder 12, so that the resin is advanced (moved to leftward in FIG. 1) within the heating cylinder 12. Subsequently, the screw 22 is retracted (moved to rightward in FIG. 1) while being rotated.

An unillustrated heater is disposed to surround the heating cylinder 12 and is adapted to heat the heating cylinder 12 to thereby melt the resin within the heating cylinder 12. Therefore, when the screw 22 is retracted by a predetermined amount, while being rotated, molten resin for one shot is accumulated on the front side of an unillustrated screw head.

In a subsequent injection step, when the screw 22 is advanced through driving of the injection motor 75, the resin accumulated on the front side of the screw head is injected from an unillustrated injection nozzle attached to the front end of the heating cylinder 12 and is charged into a cavity of an unillustrated mold apparatus.

In such a conventional injection apparatus, since the two ball screw shafts 45 are rotated at the same circumferential speed through driving of the single injection motor 75, the diameters of the respective driven pulleys 51 must be made equal in order to make their reduction ratios equal. When the diameters of the driven pulleys 51 are increased in order to increase their reduction ratios, their inertia increases, with the result that the performance of the injection apparatus is lowered. Further, the timing belt 77 must have a longer length. When θ1 represents an effective angle of engagement of the drive pulley 76 which establishes meshing engagement for transmitting rotation from the injection motor 75 to the timing belt 77, and θ2 and θ3 respectively represent effective angles of engagement of the driven pulleys 51 which establish meshing engagements for transmitting rotation from the timing belt 77 to the respective ball screw shafts 45, the following equation is satisfied.

$$\theta1+\theta2+\theta3=360°$$

When the drive-side effective angle θ1 is small, as shown in FIG. 3, the rotation transmitted from the injection motor 75 cannot be transmitted to the timing belt 77 in a reliable manner. Therefore, rotation cannot be transmitted to the ball screw shafts 45 in a stable manner, resulting in a deterioration in the performance of the injection apparatus.

The inter-axis distance L1 between the drive pulley 76 and the driven pulleys 51 or the widths of the driven pulleys 51, the drive pulley 76, and the timing belt 77 may be increased in order to increase the drive-side effective angle θ1.

However, when the inter-axis distance L1 is increased, the size of the injection machine increases, because the width of the movable plate 36 or the depth of the drive section must be increased. When the widths of the driven pulleys 51, the drive pulley 76, and the timing belt 77 are increased, noise generated when the injection motor 75 is driven at high speed increases.

SUMMARY OF THE INVENTION

An injection apparatus is provided which comprises a cylinder section; a stationary plate fixed to a rear end of said cylinder section; a movable plate movable relative to said stationary plate; an injection member disposed within said cylinder section such that said injection member can be advanced and retracted, a rear end of said injection member being rotatably supported by said movable plate; drive means for generating a rotation; a plurality of conversion means each disposed between said stationary plate and said movable plate and adapted to covert a rotational force to a thrust force; transmission means disposed between said drive means and only a first conversion means of said plurality of conversion means for transmitting the rotation generated by said drive means to said first conversion means; and synchronization means for synchronizing rotation of said first conversion means with rotation of the remaining conversion means.

An injection apparatus is provided which comprises an injection apparatus comprising a first support; a second support, moveable relative to said first support; a cylinder fixed to said first support; a screw, rotatably connected to said second support, disposed within said cylinder; at least first and second ball and screw mechanisms connecting said first support to said second support, operable to move said second support relative to said first support; a motor having a rotatable output shaft; a first transmission transmitting a rotation of the output shaft of the motor to only said first ball and screw mechanism; and a second transmission transmitting a rotation of the first ball and screw mechanism to at least said second ball and screw mechanism.

A method of operating an injection apparatus including a cylinder fixed to a first support and a metering screw rotatably connected to a second support and disposed within said cylinder is provided, comprising rotating a driving pulley with a motor; rotating a first screw through a belt connection from said driving pulley to a driven pulley fixed to said first screw; rotating at least a second screw through a transmission connected between said first screw and said second screw; and moving said first support relative to said second support via forces exerted by said first and second screws respectively on first and second nuts disposed about said first and second screws.

BRIEF DESCRIPTION OF THE DRAWINGS

The structure and features of the injection apparatus according to the present invention will be readily appreciated as the same becomes better understood by reference to the accompanying drawings, in which.

DESCRIPTION OF PREFERRED EMBODIMENT

An embodiment of the present invention will next be described in detail with reference to the drawings.

Figure 4:
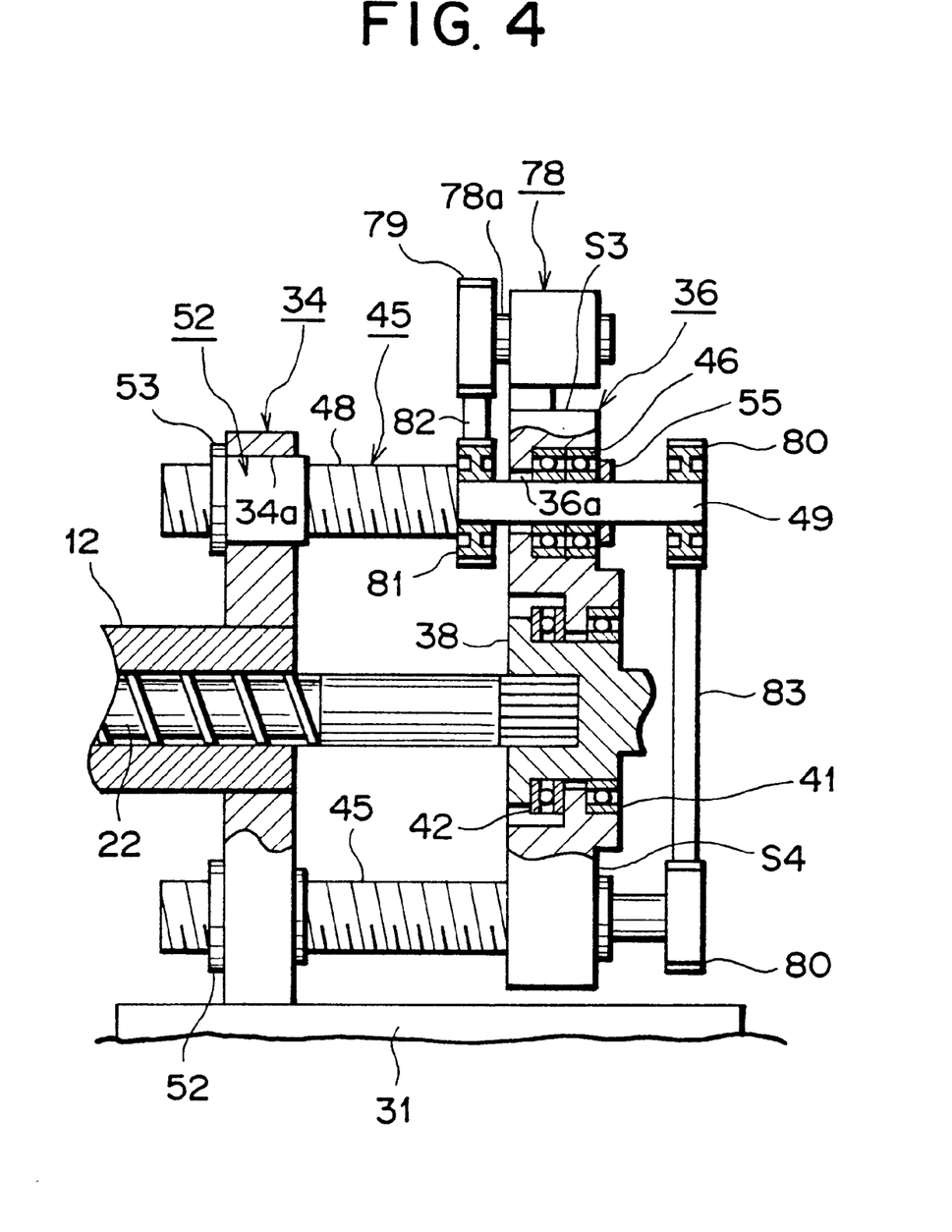
FIG. 4 is a sectional view of a drive section of an injection apparatus according to an embodiment of the present invention.
Figure 5:
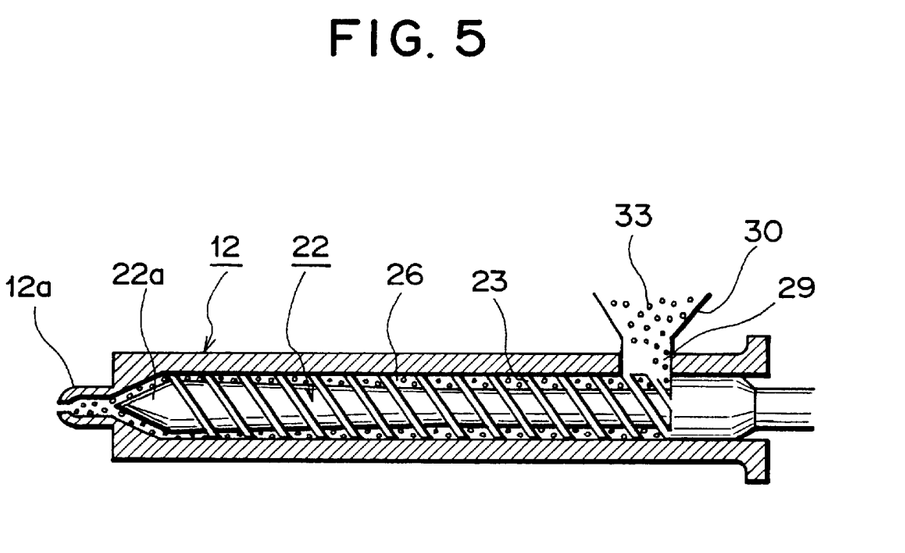
FIG. 5 is a sectional view of a main portion of the injection apparatus according to the embodiment of the present invention.
Figure 6:
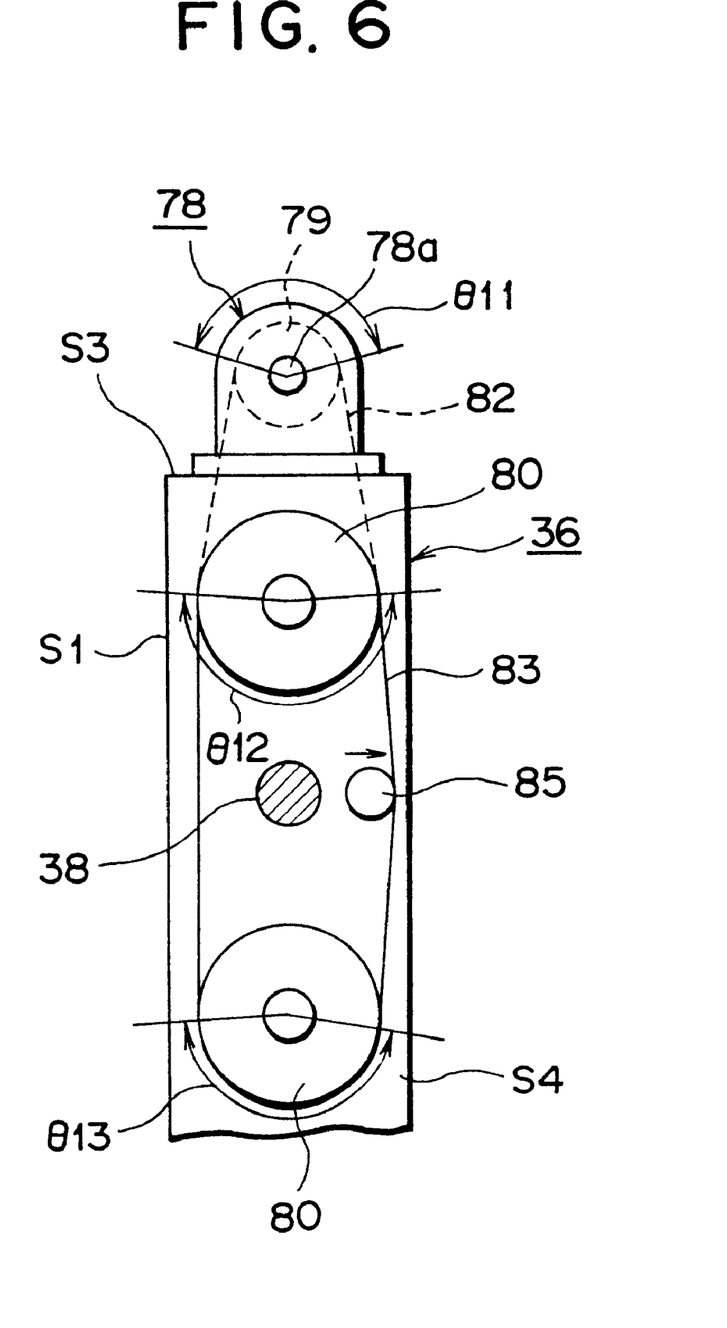
FIG. 6 is a side view of the drive section of the injection apparatus according to the embodiment of the present invention.

FIG. 4 is a sectional view of a drive section of an injection apparatus according to an embodiment of the present invention; FIG. 5 is a sectional view of a main portion of the injection apparatus according to the embodiment of the present invention; and FIG. 6 is a side view of the drive section of the injection apparatus according to the embodiment of the present invention.

In FIG. 5, reference numeral 12 denotes a heating cylinder serving as the cylinder section, and an injection nozzle 12*a* is attached to the front end (left end in FIG. 5) of the heating cylinder 12. A screw 22 serving as the injection member is disposed within the heating cylinder 12 such that the screw 22 can be rotated and can be advanced and retracted.

The screw 22 has a screw head 22*a* at its front end, and extends rearward (rightward in FIG. 5) within the heating cylinder 12. The rear end (right end in FIG. 5) of the screw 22 is connected to a drive section, which will be described later. Also, a spiral flight 23 is formed on the peripheral surface of the screw 22, thereby forming a groove 26.

A resin supply port 29 is formed at a predetermined position on the heating cylinder 12, and a hopper 30 is fixed to the resin supply port 29. Thus, resin 33 accommodated within the hopper 30 can be supplied to the resin supply port 29. The resin supply port 29 is formed at a position such that the resin supply port 29 faces the rear end portion (right-side end in FIG. 5) of the groove 26 when the screw 22 is positioned at a foremost position (leftward in FIG. 5) within the heating cylinder 12.

Next, the drive section will be described.

In FIG. 4, reference numeral 12 denotes the heating cylinder, 22 denotes the screw, 31 denotes a slide table slidably disposed on an unillustrated frame, and 34 denotes a stationary plate fixed to the slide table 31. The rear end (right end in FIG. 4) of the heating cylinder 12 is fixed to the stationary plate 34. Further, a movable plate 36 is disposed such that the movable plate 36 can be advanced and retracted relative to the stationary plate 34.

A screw support shaft 38 is disposed at the approximate center of the movable plate 36 and is rotatably supported thereby via bearings 41 and 42. The rear end of the screw 22 is fixed to the screw support shaft 38, and an unillustrated driven pulley is fixed to the rear end of the screw support shaft 38. The bearing 42 assumes the form of a thrust bearing in order to bear injection force that acts on the screw 22 upon injection.

An unillustrated metering motor serving as the first drive means is attached to one side surface S1 of the movable plate 36, and an unillustrated drive pulley is attached to the output shaft of the metering motor. A timing belt extends between and is wound, under tension, around the drive pulley and the driven pulley. Each of the drive pulley, the driven pulley, and the timing belt is of a toothed type.

Two parallel ball screw shafts 45 are disposed at positions in the vicinity of the circumferential edge of the movable plate 36 and are rotatably supported by the movable plate 36 via bearings 46. Each of the ball screw shafts 45 has a screw portion 48 and a shaft portion 49 projecting from the rear end (right end in FIG. 4) of the screw portion 48. The shaft portion 49 penetrates a hole 36a formed in the movable plate 36 and extends rearward (rightward in FIG. 4), and a synchronization pulley 80 is attached to the rear end of the shaft portion 49. In the upper ball screw shaft 45, a driven pulley 81 is attached to the front end (left end in FIG. 4) of the shaft portion 49. Reference numeral 55 denotes a press plate for pressing the bearing 46.

The screw portion 48 of each ball screw shaft 45 penetrates a hole 34a formed in the stationary plate 34 and extends frontward (leftward in FIG. 4) to be screw-engaged with a ball nut 52 attached to the stationary plate 34. The ball nut 52 has a flange portion 53 at its front end (left end in FIG. 4) and is fixed to the stationary plate 34 by use of unillustrated bolts that penetrate the flange portion 53. A ball screw composed of the ball screw shaft 45 and the ball nut 52 serving as the conversion means is disposed between the stationary plate 34 and the movable plate 36 and is adapted to covert rotational force to thrust force.

An injection motor 78 serving as the second drive means is attached to the top surface S3 of the movable plate 36. A drive pulley 79 is attached to the output shaft 78a of the injection motor 78, and a timing belt 82 extends between and is wound, under tension, around the drive pulley 79 and the driven pulley 81. The drive pulley 79, the driven pulley 81, and the timing belt 82 constitute the transmission means.

Further, a tension roller 85 is rotatably disposed on the rear end surface S4 of the movable plate 36, and a timing belt 83 extends between and is wound, under tension, around the synchronization pulley 80 and the tension roller 85. The tension roller 85 is movably disposed, and tension is applied to the timing belt 83 in the direction of an arrow in FIG. 6.

In the present embodiment, the tension roller 85 is disposed on the back-face-side of the timing belt 83 in order to apply tension to the timing belt 83 in the direction indicated by the arrow. However, the tension roller 85 may be disposed on the front-face-side of the timing belt 83 in order to apply tension to the timing belt 83 in the direction opposite that indicated by the arrow. In this case, a toothed tension roller is not used for the tension roller 85. The synchronization pulley 80, the timing belt 83, and the tension roller 85 constitute the synchronization means for synchronizing rotation of one ball screw with rotation of the remaining ball screw(s). Each of the drive pulley 79, the synchronization pulley 80, the driven pulley 81, the timing belts 82 and 83, and the tension roller 85 is of a toothed type.

Next, operation of the injection apparatus having the above-described structure will be described.

In a metering stage, when the screw 22 is rotated through driving of the metering motor, the resin 33 within the hopper 33 falls and enters the heating cylinder 12, so that the resin A3 is advanced (moved leftward in FIG. 5) within the heating cylinder 12. Subsequently, the screw 22 is retracted (moved rightward in FIG. 5) while being rotated.

An unillustrated heater is disposed to surround the heating cylinder 12 and is adapted to heat the heating cylinder 12 to thereby melt the resin 33 within the heating cylinder 12. Therefore, when the screw 22 is retracted by a predetermined amount, while being rotated, the molten resin 33, in an amount required for one shot, is accumulated on the front side of the screw head 22a.

In a subsequent injection step, the injection motor 78 is driven. The rotation of the injection motor 78 is transmitted to one of the ball screw shafts 45 via the drive pulley 79, the timing belt 82, and the driven pulley 81. The rotations transmitted to the respective ball screw shafts 45 are synchronized with each other via the timing belt 83 and the synchronization pulleys 80.

Accordingly, as the ball screw shafts 45 rotate, the respective ball nuts 52 are advanced, so that the screw 22 is advanced via the movable plate 36. As a result, the portion of the resin 33 accumulated on the front side of the screw head 22a is injected from the injection nozzle 12a and is charged into a cavity of an unillustrated mold apparatus.

In the injection apparatus having the above-described structure, in order to rotate the two ball screw shafts 45 through driving of the single injection motor 78, the timing belt 82 extends between and is wound around the drive pulley 79 and the driven pulley 81, and the timing belt 83 extends between and is wound around the synchronization pulleys 80 and the tension roller 85. Therefore, each of the timing belts 82 and 83 travels along a track of a substantially oval shape. In this case, an effective angle θ11 of the drive pulley 79 which contributes to transmission of rotation from the injection motor 78 to the timing belt 82 is approximately 180°, and an effective angle θ12 of the driven pulley 81 which contributes to transmission of rotation from the timing belt 82 to the corresponding ball screw shaft 45 is approximately 180°.

An effective angle θ13 of each synchronization pulley 80 which contributes to synchronization of rotation transmitted from the shaft portion 49 becomes approximately 180°.

Since the respective effective angles θ11–θ13 are increased sufficiently, the rotation transmitted from the injection motor 78 can be reliably transmitted to the timing belt 83, and the rotations transmitted to the respective synchronization pulleys 80 can be synchronized in a reliable manner. As a result, the rotation can be transmitted to the ball screw shafts 45 in a stabilized manner, so that the performance of the injection apparatus can be improved.

Since the output shaft 78a of the injection motor 78 is not required to be disposed at a location away from the movable plate 36, the size of the injection apparatus can be decreased.

Since the widths of the drive pulley 79, the synchronization pulleys 80, the driven pulley 81, and the timing belts 82 and 83 are not required to be increased, noise generated when the injection motor 78 is driven at high speed can be decreased.

Further, since the drive pulley 79, the driven pulley 81, and the timing belt 82 are disposed independent of the synchronization pulleys 80 and the timing belt 83, the specifications of the drive pulley 79, the driven pulley 81, and the timing belt 82 can be set to differ from those of the synchronization pulleys 80 and the timing belt 83. Therefore, the size of, for example, the driven pulley 81 can be decreased, and the corresponding inertia can be decreased.

In the above described embodiment, the synchronization means is constituted by the synchronization pulleys 80, the timing belt 83, and the tension roller 85. However, the synchronization means may be constituted by a gear mechanism. In this case, a synchronization gear is attached to the rear end of each shaft portion 49, and an idle gear is disposed between the synchronization gears in order to transmit rotation. The idle gear is disposed such that all of the synchronization gears rotate in the same direction.

It is emphasized that the present invention is not limited to the above-described embodiments. Numerous modifications and variations of these embodiments are possible in light of the spirit of the present invention, and they are not excluded from the scope of the present invention.

Many advantages of the various aspects of the above described embodiments will be apparent to those skilled in the art. However, not all of these aspects are intended to be a necessary part of the invention as it is most broadly defined. The spirit and scope of the invention is intended to be defined only by the following claims.

What is claimed is:

1. An injection apparatus comprising:

a cylinder section;

a stationary plate fixed to a rear end of said cylinder section;

a movable plate movable relative to said stationary plate;

an injection member disposed within said cylinder section such that said injection member advances and retracts, a rear end of said injection member being rotatably supported by said movable plate;

a drive apparatus for generating a rotation;

a plurality of conversion means each disposed between said stationary plate and said movable plate and adapted to convert a rotational force to a thrust force;

transmission means disposed between said drive apparatus and only a first conversion means of said plurality of conversion means for transmitting the rotation generated by said drive apparatus to said first conversion means; and synchronization means for synchronizing rotation of said first conversion means with rotation of the remaining conversion means and for transmitting a force between said first conversion means and the remaining conversion means.

2. An injection apparatus according to claim 1, wherein said synchronization means comprises a plurality of synchronization pulleys and a timing belt extending between and wound around said synchronization pulleys.

3. An injection apparatus according to claim 2, wherein said timing belt contacts approximately 180° of a rim of each of said synchronization pulleys.

4. An injection apparatus according to claim 1, wherein said synchronization means comprises a plurality of synchronization gears and an idle gear disposed between said synchronization gears.

5. An injection apparatus according to claim 1, wherein said transmission means is disposed on said movable plate.

6. An injection apparatus according to claim 1, wherein said synchronization means is disposed on said movable plate.

7. The injection apparatus according to claim 1, wherein said transmission means includes a driving pulley connected to said drive apparatus, a driven pulley connected to said first conversion means and a timing belt wound around said driving pulley and said driven pulley.

8. The injection apparatus according to claim 6, wherein said timing belt contacts approximately 180° of a rim of said driving pulley and said timing belt contacts approximately 180° of a rim of said driven pulley.

9. An injection apparatus comprising:

a first support;

a second support, moveable relative to said first support;

a cylinder fixed to said first support;

a screw, rotatably connected to said second support, disposed within said cylinder;

at least first and second ball and screw mechanisms connecting said first support to said second support, operable to move said second support relative to said first support;

a motor having a rotatable output shaft;

a first transmission transmitting a rotation of the output shaft of the motor to only said first ball and screw mechanism; and a second transmission transmitting a rotation of the first ball and screw mechanism to at least said second ball and screw mechanism.

10. The injection apparatus of claim 9, wherein said first and second supports are plates.

11. The injection apparatus of claim 9, wherein said first transmission includes a driving pulley connected to the output shaft of the motor, a driven pulley connected to a screw of the first ball and screw mechanism, and a belt wound around said driving pulley and said driven pulley.

12. The injection apparatus of claim 11, wherein said belt contacts approximately 180° of a rim of said driving pulley and contacts approximately 180° of a rim of said driven pulley.

13. The injection apparatus of claim 9, wherein said second transmission includes a first pulley connected to a screw of the first ball and screw mechanism, a second pulley connected to a screw of the second ball and screw mechanism and a belt wound around said first pulley and said second pulley.

14. The injection apparatus of claim 13, wherein said belt contacts about 180° of a rim of said first pulley and contacts approximately 180° of a rim of said second pulley.

15. The injection apparatus of claim 9, wherein said second transmission includes a plurality of synchronization gears and an idle gear disposed between said synchronization gears.

16. A method of operating an injection apparatus including a cylinder fixed to a first support and a metering screw rotatable connected to a second support and disposed within said cylinder, the method comprising:

(a) rotating a driving pulley with a motor;

(b) rotating a screw of a first ball and screw mechanism through a belt connection from said driving pulley to a driven pulley fixed to said screw of said first ball and screw mechanism;

(c) rotating at least a screw of a second ball and screw mechanism through a transmission connected between said screw of said first ball and screw mechanism and said screw of said second ball and screw mechanism; and (d) moving said first support relative to said second support via forces exerted by said screw of the first ball and screw mechanism and said screw of said second ball and screw mechanism, respectively on first and second nuts disposed about said screw of said first ball and screw mechanism and said screw of said second ball and screw mechanism.

17. The method of claim 16, wherein step (c) includes rotating at least said screw of the second ball and screw mechanism through a belt connection between a first synchronization pulley connected to said screw of the first ball and screw mechanism and a second synchronization pulley connected to said screw of the second ball and screw mechanism.

18. The method of claim 17, wherein step (c) includes rotating at least said screw of the second ball and screw mechanism through a belt connection which winds around approximately 180° of a rim of said first synchronization pulley and which winds around approximately 180° of a rim of said second synchronization pulley.

19. The method of claim 16, wherein step (b) includes rotating said screw of the first ball and screw mechanism through a belt connection which winds around approximately 180° of a rim of said driving pulley and which winds around approximately 180° of a rim of said driven pulley.

* * * * *